UNITED STATES PATENT OFFICE

ALBERT H. CASE, OF SHORT HILLS, NEW JERSEY

MANUFACTURE OF ACID PHOSPHATE

No Drawing.   Application filed January 16, 1930.   Serial No. 421,264.

The present invention relates to the manufacture of acid phosphate and more particularly relates to the continuous manufacture of acid phosphate fertilizer and phosphoric acid.

In the manufacture of acid phosphate fertilizer, as is well known, phosphate rock is first subjected to grinding in a dry condition. The ground rock is then treated with sulfuric acid having a concentration of approximately 65% $H_2SO_4$ in order to convert insoluble phosphate into a soluble condition. The acid-treated rock after thorough mixing is stored in piles in so-called "dens" for partial completion of the reaction. Following the treatment in the dens, the material is stored in piles until the reaction between the sulfuric acid and the rock is practically complete. After the completion of the aforesaid reaction, the material is ready for shipment or for mixing with other materials to produce a complete fertilizer.

Many attempts have been made to improve the aforesaid process, particularly with respect to cutting down the time required for the production of the finished acid phosphate, to saving power used in the comminution of the rock, and to cheapening generally the cost of production. All the attempts, so far as I am aware, have been unsuccessful and unsatisfactory for one reason or another and none has replaced the old method of manufacturing acid phosphate.

I have discovered a method which eliminates many of the shortcomings of the prior processes of the manufacture of acid phosphate and which provides an economical system of production, a continuous process and a quicker process. In addition, my discovery contemplates the provision of a method which involves a considerable saving in power required for grinding the phosphate rock to the required degree, and which produces a ground material of more or less uniform size, capable of reacting quickly and uniformly.

In accordance with the present invention, I grind the phosphate rock in the presence of an abundance of water. In conjunction with my wet grinding, I prefer to incorporate a classification system which will facilitate the grinding of the rock to a uniform size without the production of excess fine material. The wet ground material is removed from the water and only a sufficient amount of water is allowed to remain with the material to form a rock slurry which can be transported from place to place by means of pumps and short pipes.

The rock slurry is pumped to a mixing vessel in which it is treated not with dilute acid, as was commonly used, in the manufacture of acid phosphate, but a concentrated sulfuric acid such as 66° Bé. acid or 100% acid. In case sufficient water is not present in the slurry to effect the proper reaction between sulfuric acid and the phosphate rock, the mass can be diluted with warm or cold water.

After the rock slurry has been treated with sulfuric acid and intimately mixed therewith, the entire mass can be pumped into the customary dens. The mass of material is then allowed to remain in the dens for completion of the reaction between the sulfuric acid and the phosphate rock in the usual manner. Following the treatment in the dens, the material is subjected to the customary operations heretofore used in acid phosphate manufacture.

The following specific example is given for illustrative purposes and for a better understanding of the invention, and is not to be taken as a limitation of the scope of the invention.

According to my method the acid phosphate rock is ground in the presence of water to a fineness of 80% through 200 mesh. Associated with the grinding apparatus is an appropriate classifier which returns coarse material for regrinding and permits the finely ground material to pass on. This finely ground material is then passed through a dewatering device, which removes a portion of the water. Sufficient water is permitted to remain so that upon the subsequent addition of concentrated acid, the resulting strength of the acid in the rock slurry is sufficient to cause a reaction between the sulfuric acid and the phosphate rock. The ground material is of practically a uniform size and does not contain any excessive amounts of very fine material or coarse material.

In all cases, I prefer to leave a sufficient amount of water with the ground rock to form a rock slurry which is capable of being pumped through short pipes so as to facilitate the transportation and handling of the material. When a pumping system is utilized, the required or proper amount of concentrated sulfuric acid can be fed directly to the supply pipe containing the rock slurry. A very convenient mode of introducing the required amount of sulfuric acid to the rock slurry is to employ a common prime mover for the rock slurry pump and the acid pump. By utilizing the proper gearing between the prime mover and the two said pumps, the proper amounts of rock slurry and of acid can be introduced into the mixing vessel or into a common supply pipe. In this manner, the process can be conducted in a continuous manner instead of on a batch basis as heretofore employed.

The following specific example is illustrative of a preferred procedure of carrying my invention into practice.

Phosphate rock is preferably ground so that 80% will pass through a 200 mesh screen or 90% through a 150 mesh screen. I have also found it satisfactory to grind the rock so that 90% passes through a 60 mesh screen and in other cases so that 90% passes through 100 mesh screen. In conducting the grinding operation, the last stage or the latter stages of which are preferably conducted in a rod mill or a ball mill, wherein the amount of water is preferably five times the weight of rock undergoing grinding. In conjunction with the grinding machines any appropriate classifier can be used but I prefer those of the cone type, particularly a cone classifier known to the trade as one of the Dorr type.

When conducting grinding with the aforesaid equipment I am able to produce very much finer particles than commercially used heretofore and at a cost of about 10 H. P. per ton of phosphate rock ground per hour. In contrast to the low consumption of power by the use of my method, the old methods consumed anywhere from 20 to somewhat over 40 H. P. per ton of phosphate rock ground per hour. The specific amount of power consumed of course depended upon the fineness to which the rock was ground but the lowest consumption of energy was in the neighborhood of 20 H. P. per ton of rock ground per hour.

The excess water is drained off from the ground rock so that the rock slurry contains roughly about one part of ground phosphate rock and one-third part of water. To this slurry is added concentrated sulfuric acid in the proportion of two-thirds of a part of sulfuric acid to one part of ground rock and one-third part of water. Upon the addition of acid to the rock slurry the entire mass is thoroughly mixed and the temperature rises to approximately 100° C. Thus the mass heats from room temperature to almost the boiling point of the liquid materials. At such a temperature the reaction of converting insoluble phosphate rock into soluble phosphate rock takes place extremely rapidly. In fact the time required for the reaction to be approximately completed is in the neighborhood of one minute or less. If the materials are ground fine enough the time can be cut to about twenty seconds. The prior processes required over ten minutes before the reaction was 95% complete. The finished product is treated in the customary manner and contains primary and secondary calcium phosphate.

The process as outlined above can also be applied to the manufacture of phosphoric acid. In this application more water is used and the rock slurry is preferably three times wetter than the one specified hereinabove. During the mixing process after the acid has been added the temperature will rise to about 75° C. When phosphoric acid is made, of course, about 50% more acid is consumed than that used when making acid phosphate.

With the fine grinding and high temperature utilized by my invention I am able to effect a considerable saving of sulfuric acid. In practice I am able to convert tertiary calcium phosphate more completely into primary calcium phosphate and secondary calcium phophate and, at the same time, use less sulfuric acid than was consumed heretofore by prior processes. In addition the percentage of secondary calcium phosphate is greater by my new method than by known processes. In other words, the ratio of the secondary phosphate to the primary phosphate is increased. In practice I have found in many instances that the residue of insoluble phosphate remaining after the reaction is materially decreased and that I am able to effect a saving of about 10% of sulfuric acid consumed. I have found that my process gives a new acid phosphate product which contains more than 20 to 25% of secondary calcium phosphate.

By the utilization of my invention it is possible to produce acid phosphate fertilizer more cheaply, more quickly and more uniformly than heretofore. The phosphate rock is ground to a finer and more uniform condition than in prior processes and is treated in a wet condition with concentrated sulfuric acid which liberates heat upon coming in contact with the water. Due to the elevation in temperature, the reaction between sulfuric acid and the phosphate rock takes place more readily. The foregoing features have a tendency to decrease the percentage of insoluble tri-calcium phosphate left in the acid phosphate. Moreover, heat which was ordinarily lost in the conventional manufacture of acid phosphate, is conserved by my process because the liberation of heat elevates more than 100° C. the temperature of the reacting medium and thus quickens the reaction and shortens the time required to convert insoluble tri-calcium phosphate into soluble acid phosphate to less than a minute.

It will be observed that the present invention is not only useful for the manufacture of acid phosphate fertilizer, but can also be used advantageously in the manufacture of phosphoric acid. In this case, the rock slurry is about three times wetter than in the acid phosphate manufacture. It is treated with strong sulfuric acid as described heretofore, say, about 100% acid. As the heat evolved in this case will be great enough to raise the temperature of the entire mass by 75° C. a very rapid reaction occurs between the sulfuric acid and the phosphate rock. Accordingly, the time of operation is considerably shortened and the capacity of the apparatus and equipment is materially increased.

When in the claims I refer to "soluble acid phosphate" I mean either water soluble or citrate soluble phosphate, i. e., either primary calcium phosphate or secondary calcium phosphate.

Similarly when in the claims I refer to "soluble phosphate compounds" I mean either phosphoric acid or primary calcium phosphate or secondary calcium phosphate or mixtures thereof or other soluble phosphate compounds produced by my process.

Furthermore, when I employ the expression "concentrated or strong sulfuric acid" in the claims, I refer to sulfuric acid which has a concentration greater than about 65° Bé.

I claim:

1. The manufacture of a soluble phosphate from insoluble phosphate rock which comprises grinding said insoluble phosphate rock to approximately 200 mesh in the presence of an excess amount of water, separating ground rock coarser than approximately 200 mesh from the finely ground 200 mesh material, removing the excess of water from said finely ground phosphate rock and then adding to said finely ground phosphate rock concentrated sulfuric acid having a strength greater than approximately 65° Bé. whereby the material will be brought to a highly heated state and the conversion of said insoluble phosphate rock to a soluble phosphate will occur in a relatively short period of time.

2. The manufacture of a soluble phosphate from insoluble phosphate rock which comprises grinding said insoluble phosphate rock to approximately 200 mesh in the presence of an excess amount of water, separating ground rock coarser than approximately 200 mesh from the finely ground 200 mesh material, returning the coarse material for re-grinding in the first step, removing the excess of water from said finely ground phosphate rock and then adding to said finely ground phosphate rock concentrated sulfuric acid having a strength greater than approximately 65° Bé. whereby the material will be brought to a highly heated state and the conversion of said insoluble phosphate rock to a soluble phosphate will occur in a relatively short period of time.

3. The continuous manufacture of acid phosphate from phosphate rock which comprises continuously grinding the phosphate rock to approximately 80% through 200 mesh in the presence of an excess amount of water, separating material coarser than approximately 200 mesh from said finely ground phosphate rock, returning said coarse material for re-grinding in the first step, removing an excess of water in such an amount that the rock and water will be present in the proportion of about three parts of rock by weight to about one part of water by weight, adding concentrated sulfuric acid having a strength greater than about 65° Bé. in such an amount that the finely ground phosphate rock, water and sulfuric acid will be present in a proportion of about one part of rock to about one-third part of water to about two-thirds part of concentrated sulfuric acid by weight whereby a substantial rise of temperature occurs and the insoluble finely ground phosphate rock is converted into acid phosphate within a relatively short period of time.

In witness whereof, I hereunto set my hand.

ALBERT H. CASE.